(12) United States Patent
Langford

(10) Patent No.: US 7,449,060 B2
(45) Date of Patent: Nov. 11, 2008

(54) LOW DUST WALL REPAIR COMPOUND

(75) Inventor: Nathaniel P. Langford, Somerset, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 24 days.

(21) Appl. No.: 11/277,853

(22) Filed: Mar. 29, 2006

(65) Prior Publication Data

US 2006/0156961 A1    Jul. 20, 2006

Related U.S. Application Data

(60) Continuation of application No. 11/029,759, filed on Jan. 5, 2005, now Pat. No. 7,052,544, which is a division of application No. 10/788,053, filed on Feb. 26, 2004, now Pat. No. 6,863,723, which is a division of application No. 09/821,392, filed on Mar. 29, 2001, now Pat. No. 6,733,581, which is a continuation-in-part of application No. 09/208,782, filed on Dec. 10, 1998, now Pat. No. 6,358,309.

(51) Int. Cl.
*C08K 3/00* (2006.01)
*C04B 24/02* (2006.01)
*C04B 24/08* (2006.01)
*C04B 24/14* (2006.01)

(52) U.S. Cl. .................. 106/658; 106/660; 106/788; 106/780

(58) Field of Classification Search .................. 106/658, 106/660, 778, 780
See application file for complete search history.

(56) References Cited

U.S. PATENT DOCUMENTS

| | | | |
|---|---|---|---|
| 2,117,833 A | 3/1938 | Wellner | |
| 3,181,107 A | 4/1965 | Garber et al. | |
| 3,183,107 A | 5/1965 | Alford | |
| 3,984,269 A | 10/1976 | Schneller et al. | |
| 4,038,443 A | 7/1977 | Jacoby | |
| 4,073,968 A | 2/1978 | Miyamoto et al. | |
| 4,136,050 A | 1/1979 | Brehm | |
| 4,171,276 A | 10/1979 | Brehm | |
| 4,238,239 A | 12/1980 | Brown | |
| 4,269,721 A | 5/1981 | Mueller et al. | |
| 4,286,995 A | 9/1981 | Smith et al. | |
| 4,294,622 A | 10/1981 | Brown | |
| 4,311,656 A | 1/1982 | Spriggs | |
| 4,316,811 A | 2/1982 | Burns et al. | |
| 4,336,071 A * | 6/1982 | Schnorrer ................ | 106/198.1 |
| 4,369,121 A | 1/1983 | Callahan et al. | |
| 4,370,167 A | 1/1983 | Mudd | |
| 4,380,459 A | 4/1983 | Netting | |
| 4,391,647 A | 7/1983 | Deer et al. | |
| 4,400,220 A | 8/1983 | Cole, Jr. | |
| 4,417,992 A | 11/1983 | Bhattacharyya et al. | |
| 4,425,252 A | 1/1984 | Cargle et al. | |
| 4,428,984 A | 1/1984 | Shimizu et al. | |
| 4,451,605 A | 5/1984 | Theodore | |
| 4,454,267 A | 6/1984 | Williams | |
| 4,469,612 A | 9/1984 | Fenton | |
| 4,487,615 A | 12/1984 | Taylor et al. | |
| 4,549,966 A | 10/1985 | Beall | |
| 4,551,261 A | 11/1985 | Salihar | |
| 4,551,401 A | 11/1985 | Wilson | |
| 4,561,905 A | 12/1985 | Kittle | |
| 4,571,116 A | 2/1986 | Patil et al. | |
| 4,587,279 A | 5/1986 | Salyer et al. | |
| 4,650,598 A | 3/1987 | Roberts et al. | |
| 4,657,594 A | 4/1987 | Struss | |
| 4,686,253 A | 8/1987 | Struss et al. | |
| 4,737,305 A | 4/1988 | Dohner | |
| 4,780,143 A | 10/1988 | Roe | |
| 4,780,233 A | 10/1988 | Roe | |
| 4,782,632 A | 11/1988 | Matechuk | |
| 4,801,635 A | 1/1989 | Zinkan et al. | |
| 4,825,939 A | 5/1989 | Salyer et al. | |
| 4,836,945 A | 6/1989 | Kestner | |
| 4,897,218 A | 1/1990 | Roe | |
| 4,955,748 A | 9/1990 | Krumholz | |
| 4,960,532 A | 10/1990 | Kremer | |
| 4,971,720 A | 11/1990 | Roe | |
| 4,972,013 A | 11/1990 | Koltisko, Jr. et al. | |
| 4,981,398 A | 1/1991 | Field et al. | |

(Continued)

FOREIGN PATENT DOCUMENTS

| | | |
|---|---|---|
| CA | 763000 | 7/1967 |
| CA | 1117989 | 2/1982 |
| CA | 2163191 A | 5/1997 |
| DE | 199 54 829 A1 | 5/2001 |
| EP | 0 008 030 A1 | 2/1980 |
| EP | 0 352 585 A2 | 1/1990 |
| EP | 0 445 653 A1 | 9/1991 |
| EP | 0 530 084 B1 | 3/1996 |
| FR | 2554120 A1 | 5/1985 |
| GB | 892015 | 3/1962 |

(Continued)

*Primary Examiner*—Kelechi C Egwim
(74) *Attorney, Agent, or Firm*—David B. Patchett

(57) ABSTRACT

A wall repair compound useful for filling and repairing cracks, holes, and other imperfections in a wall surface includes a conventional filler material, a conventional binder material, and a dust reducing additive which reduces the quantity of airborne dust particles generated when sanding the hardened joint compound. Airborne dust reducing additives include oils, surfactants, solvents, waxes, and other petroleum derivatives. The additive can be added to conventional ready-mixed joint compounds and to setting type joint compounds. A method of reducing the quantity of airborne dust generated when sanding a fully hardened joint compound includes mixing a sufficient quantity of the dust reducing additive with the joint compound prior to when the joint compound has been applied to the wall.

21 Claims, 1 Drawing Sheet

U.S. PATENT DOCUMENTS

| | | | |
|---|---|---|---|
| 5,007,206 A | 4/1991 | Paterson | |
| 5,102,462 A | 4/1992 | Podlas | |
| 5,112,400 A | 5/1992 | Nae et al. | |
| 5,131,198 A | 7/1992 | Ritchie et al. | |
| 5,143,645 A | 9/1992 | Roe | |
| 5,192,337 A | 3/1993 | Wajer et al. | |
| 5,194,174 A | 3/1993 | Roe et al. | |
| 5,246,775 A | 9/1993 | Loscuito | |
| 5,256,444 A | 10/1993 | Roe | |
| 5,277,712 A | 1/1994 | McInnis | |
| 5,336,318 A | 8/1994 | Attard et al. | |
| 5,362,320 A | 11/1994 | Whatcott | |
| 5,382,287 A | 1/1995 | Podlas | |
| 5,399,282 A | 3/1995 | Hansen et al. | |
| 5,412,007 A | 5/1995 | Hendrix et al. | |
| 5,439,608 A | 8/1995 | Kondrats | |
| 5,459,969 A | 10/1995 | Stibolt et al. | |
| 5,494,947 A | 2/1996 | Kaplan | |
| 5,505,032 A | 4/1996 | Wasserman et al. | |
| 5,527,212 A | 6/1996 | Bowen et al. | |
| 5,527,482 A | 6/1996 | Pullen et al. | |
| 5,531,050 A | 7/1996 | Stibolt et al. | |
| 5,534,059 A | 7/1996 | Immordino, Jr. | |
| 5,595,782 A | 1/1997 | Cole | |
| 5,604,001 A | 2/1997 | Schold | |
| 5,637,349 A | 6/1997 | Cummins et al. | |
| 5,639,397 A | 6/1997 | Roe | |
| 5,653,797 A | 8/1997 | Patel | |
| 5,658,379 A | 8/1997 | Battilana | |
| 5,779,786 A | 7/1998 | Patel | |
| 5,788,879 A | 8/1998 | Ogura et al. | |
| 5,820,967 A * | 10/1998 | Gadkaree | 428/116 |
| 6,093,241 A | 7/2000 | Alther | |
| 6,171,655 B1 | 1/2001 | Shintome | |
| 6,355,099 B1 | 3/2002 | Immordino et al. | |
| 6,358,309 B1 | 3/2002 | Langford | |
| 6,436,185 B1 | 8/2002 | Ayambem et al. | |
| 6,545,066 B1 | 4/2003 | Immordino, Jr. et al. | |
| 6,676,746 B2 | 1/2004 | Langford | |
| 2001/0011112 A1 | 8/2001 | Langford | |

FOREIGN PATENT DOCUMENTS

| | | | |
|---|---|---|---|
| GB | 1227355 | | 4/1971 |
| JP | 53-18608 | | 8/1976 |
| JP | 54-022922 | | 2/1978 |
| JP | 54007463 A | * | 1/1979 |
| JP | 56070072 A | * | 6/1981 |
| JP | 60051769 A | * | 3/1985 |
| JP | S62-98000 | | 5/1987 |
| JP | 06158047 | | 6/1994 |
| JP | 07206504 | | 8/1995 |
| WO | WO 00/34200 | | 6/2000 |

\* cited by examiner

LOW DUST WALL REPAIR COMPOUND

CROSS REFERENCE TO RELATED APPLICATIONS

This application is a continuation of U.S. application Ser. No. 11/029,759, filed Jan. 5, 2005, issued as U.S. Pat. No. 7,052,544, which is a divisional of U.S. application Ser. No. 10/788,053, filed Feb. 26, 2004, issued as U.S. Pat. No. 6,863,723, which is a divisional of U.S. application Ser. No. 09/821,392, filed Mar. 29, 2001, issued as U.S. Pat. No. 6,733,581, which is a continuation-in-part of U.S. application Ser. No. 09/208,782, filed Dec. 10, 1998, issued as U.S. Pat. No. 6,358,309.

FIELD OF THE INVENTION

The present invention relates generally to wall repair compounds such as joint compounds, spackling compounds, and the like used to repair imperfections in walls or fill joints between adjacent wallboard panels. More particularly, the present invention relates to such a wall repair compound that includes an additive which reduces the quantity of airborne dust generated when the hardened compound is sanded.

BACKGROUND OF THE INVENTION

Interior walls of residential and commercial buildings are often constructed using gypsum wallboard panels, often referred to simply as "wallboard" or "drywall." The wallboard panels are attached to studs using nails or other fasteners, and the joints between adjacent wallboard panels are filled using a specially formulated adhesive composition called joint compound to conceal the joints. The procedure for concealing the joint between adjacent wallboards, and thereby producing a smooth seamless wall surface, typically includes applying soft wet joint compound within the joint or seam formed by the abutting edges of adjacent wallboard panels using a trowel or the like. A fiberglass, cloth, or paper reinforcing tape material is then embedded within the wet joint compound, and the compound is allowed to harden. After the joint compound has hardened, a second layer of joint compound is applied over the joint and tape to completely fill the joint and provide a smooth surface. This layer is also allowed to harden. Upon hardening, the joint compound is sanded smooth to eliminate surface irregularities. Paint or a wall covering, such as wall paper, can then be applied over the joint compound so that the joint and the drywall compound are imperceptible under the paint or wall covering. The same joint compound can also be used to conceal defects caused by the nails or screws used to affix the wallboard panels to the studs, or to repair other imperfections in the wallboard panels, so as to impart a continuously smooth appearance to the wall surface.

Various drywall joint compounds are known for concealing joints between adjacent wallboard panels. Conventional joint compounds typically include a filler material and a binder. Conventional fillers are calcium carbonate and calcium sulfate dihydrate (gypsum), which are used in "ready mixed" joint compounds, and calcium sulfate hemihydrate ($CaSO_4$-½$H_2O$; also referred to as plaster of Paris or calcined gypsum), which is used in "setting type" joint compounds. Ready mixed joint compounds, which are also referred to as pre-mixed or drying type joint compounds, are pre-mixed with water during manufacturing and require little or no addition of water at the job site. Such joint compounds harden when the water evaporates and the compound dries. Setting type joint compounds, on the other hand, harden upon being mixed with water, thereby causing dihydrate crystals to form and interlock. Setting type joint compounds are therefore typically supplied to the job site in the form of a dry powder to which the user then adds a sufficient amount of water to give the compound a suitable consistency.

The Koltisko, Jr. et al. U.S. Pat. No. 4,972,013 provides an example of a ready-mixed (wet) joint compound including a filler, binder, thickener, non-leveling agent, and water. The McInnis U.S. Pat. No. 5,277,712 provides an example of a setting (dry mix-type) joint compound including a fine plaster material, such as stucco, a material which imparts internal strength and workability to the joint compound, such as methyl cellulose, and a material for retaining water, such as perlite. Additional examples of joint compounds are provided in the Brown U.S. Pat. No. 4,294,622; the Mudd U.S. Pat. No. 4,370,167; the Williams U.S. Pat. No. 4,454,267; the Struss et al. U.S. Pat. No. 4,686,253; the Attard et al. U.S. Pat. No. 5,336,318; and the Patel U.S. Pat. No. 5,779,786.

A spackling compound is disclosed in the Deer et al. U.S. Pat. No. 4,391,648. While joint compound and spackling compound do many of the same things and are both smeared onto walls to hide flaws, spackling compound is generally lighter, dries more quickly, sands more easily, and is more expensive than joint compound. For simplicity, joint compound, drywall joint compound, and the like expressions are used throughout this specification to refer to wall repair compounds generally, including joint compound and spackling compound.

Sanding hardened joint compound can be accomplished using conventional techniques including power sanders, abrasive screens, or manual sanders which consist simply of a supporting block and a piece of abrasive paper mounted on the block. Sanding the joint compound, however, produces a large quantity of an extremely fine powder which tends to become suspended in air for a long period of time. The airborne particles settle on everything in the vicinity of the sanding site and usually require several cleanings before they can all be collected, thereby making cleanup a time consuming and tedious process. The particles may also present a serious health hazard to the worker.

The airborne particles are highly pervasive and can enter the nose, lungs, eyes and even the pores of the skin. Results from a study conducted by the National Institute for Occupational Safety and Health found that dust levels in 9 out of 10 test samples taken at test sites where workers were finishing drywall with joint compound were higher than the limits set my OSHA. The report also said that the dust may not be safe even when it falls within the recommended limits. In addition, the study found that several dust samples contained silica and kaolin, a material found in clay, which have been found to cause permanent lung damage. The report recommended the use of local exhaust ventilation, wet finishing techniques, and personal protective equipment to reduce the hazard.

In an effort to reduce the dust generation and cleanup problems associated with the sanding of conventional joint compounds, various attempts have been made to develop specialized dustless drywall sanders. The Matechuk U.S. Pat. No. 4,782,632, for example, discloses a drywall sander including a sanding head designed to minimize the release of dust and further discloses attaching a vacuum cleaner to the sanding head to collect the dust. The Krumholz U.S. Pat. No. 4,955,748 discloses a dustless drywall finisher which uses a wet sponge to prevent the formation of airborne dust.

Dust remains a problem, however, when conventional power sanders or hand sanders are used to sand conventional joint compounds. A need therefore exists for a joint compound that can be sanded using conventional sanders without producing a large quantity of fine particles capable of becoming suspended in air. It would also be desirable to provide an additive that could be mixed with commercially available joint compounds to inhibit the formation of airborne particles during the sanding procedure without otherwise interfering with the properties of the joint compound.

SUMMARY OF THE INVENTION

The present invention provides a wall repair compound, such as a joint compound or spackling compound which, when sanded, generates a lower lever of airborne particles than conventional joint compounds. More specifically, the present invention provides a wall repair compound which includes a dust reducing additive. Generally, the wall repair or joint compound includes a sufficient amount of the dust reducing additive so that when the joint compound is tested as described in this specification, it generates a lower quantity of airborne dust than the joint compound would produce if it did not contain the dust reducing additive.

The dust reducing additive can be pre-mixed into the wet joint compound prior to application or applied as a coating to the hardened joint compound after application. Generally, the dust reducing additive reduces the quantity of airborne dust particles having a size of less than or equal to 10 microns to less than 50% of the quantity that would be generated without the additive. In certain embodiments, the quantity of airborne dust particles is reduced by at least 75% compared to a mixture without the additive. Most preferably, the level of airborne dust is reduced by more than 90%. In one embodiment, the quantity of airborne particles generated by sanding the hardened joint compound of the present invention was less than 50 mg/m$^3$ and, in certain other embodiments, less than about 15 mg/m$^3$. The quantity of airborne particles generated by sanding the hardened joint compound is preferably less than 5 mg/m$^3$.

It is desirable that the dust reducing additive serve to suppress the formation of airborne particles without significantly interfering with the desired characteristics of the joint compound. Suitable dust reducing additives include oils, such as mineral oils, vegetable oils and animal oils, surfactants, oleoresinous mixtures, pitch, solvents, paraffins, waxes, including natural and synthetic wax, glycols, and other petroleum derivatives. Other materials which do not fit within the above categories may also effectively reduce the quantity of dust generated by a joint compound.

The joint compound formulations include a conventional filler material and a binder material, such as a resin. The joint compound can also include a surfactant, which may or may not serve to suppress airborne dust formation, and a thickening agent. Prior to hardening, the joint compound preferably includes a sufficient amount of water to form a mud-like spreadable material which can be applied to the wall surface. The present invention further provides an additive which can be admixed with conventional joint compounds to reduce the quantity of dust generated during sanding. The dust reducing additive can be used with both drying type (i.e. ready mixed) or setting type joint compounds.

The present invention also provides a method of reducing the quantity of airborne dust generated by sanding a fully hardened joint compound which includes mixing a sufficient quantity of a dust reducing additive with the joint compound prior to applying the joint compound to a wall surface.

It is also desirable that the present invention provide a joint compound having good plasticity, water retention, cohesiveness, viscosity stability, resistance to cracking, sandability, minimal shrinkage, good paint adherence, light weight, low cost, good hardening properties, and other properties comparable to those offered by conventional joint compounds.

These and other features and advantages of the invention will be apparent to those skilled in the art when considered in view of the following detailed description.

DETAILED DESCRIPTION

Figure 1:
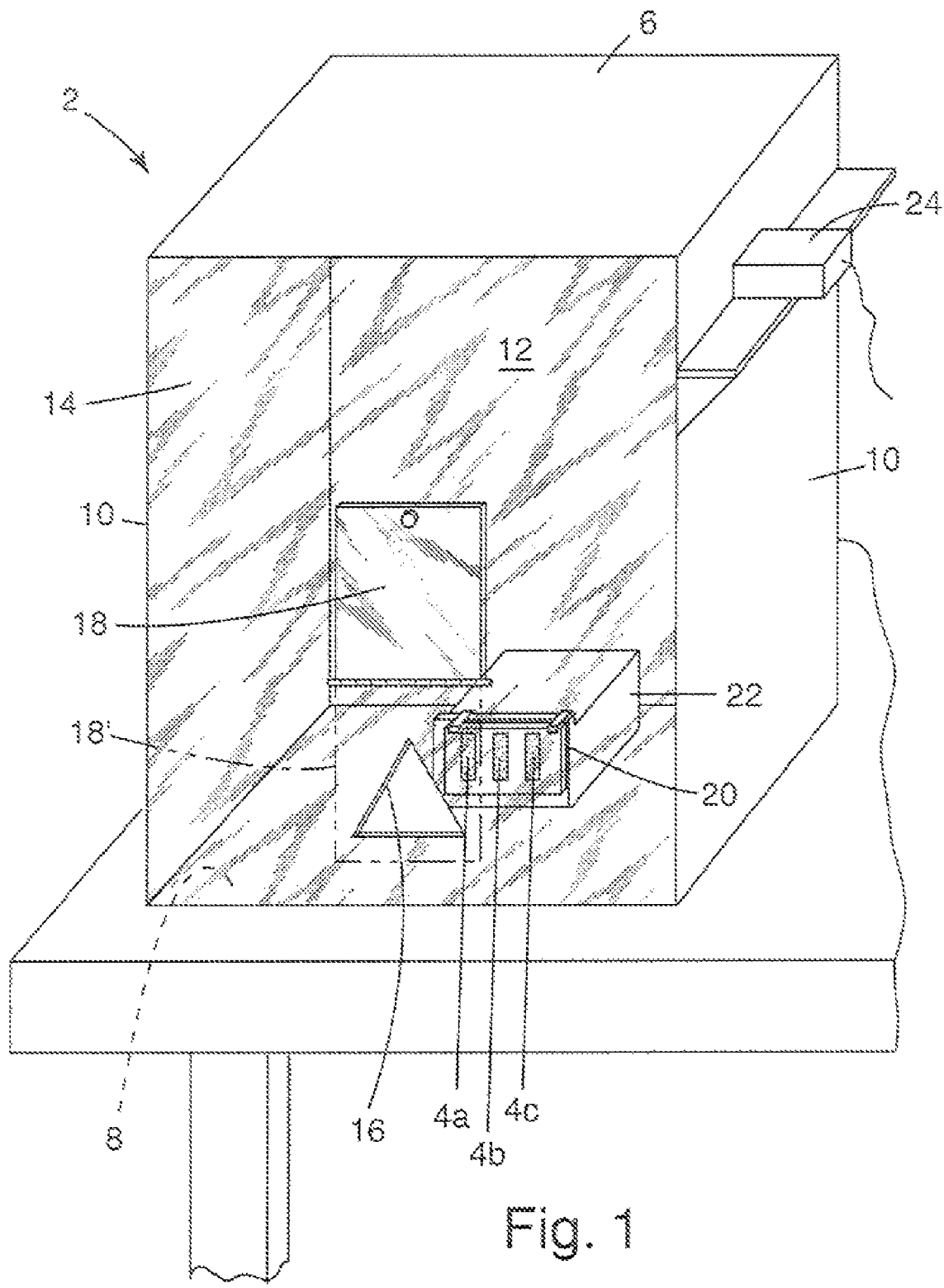
FIG. 1 is a perspective view of the testing enclosure used to measure the quantity of airborne dust generated by sanding the wall repair compounds of the present invention.

According to the present invention, there are provided compositions suitable for filling and repairing cracks, holes, or other imperfections in a wall surface, such as the joints between adjacent wallboard panels. The compositions of the present invention include a dust reducing additive combined with conventional wall repair compound materials including a filler and a binder to form a low dust wall repair compound. Dust reducing additive refers to any ingredient capable of preventing, minimizing, suppressing, reducing, or inhibiting the formation of particles capable of becoming airborne. The expressions "airborne particles" or "airborne dust particles" refer to fine particles generated during the sanding or abrading of the compound which are capable of being carried by or through the air. Wall repair compound refers generally to compositions useful for filling and repairing cracks, holes, and other imperfections in surfaces such as drywall, wood, plaster, and masonry. Wall repair compounds include interior finishing and patch compounds such as joint compound, spackling compound, wood fillers, plasters, stucco, and the like. The joint compound can also include a thickener, and other materials found in conventional joint compounds.

Any conventional filler material can be used in the present invention. Suitable fillers include calcium carbonate ($CaCO_3$) and calcium sulfate dihydrate ($CaSO_4$-$2H_2O$ commonly referred to as gypsum) for ready mixed type joint compounds, and calcium sulfate hemihydrate ($CaSO_4$-$½H_2O$) for setting type joint compounds. The joint compound can also include one or more secondary fillers such as glass micro bubbles, mica, perlite, talc, limestone, pyrophyllite, silica, and diatomaceous earth. The filler generally comprises from about 25% to about 95% of the weight of the joint compound based on the total wet weight of the formulation (i.e. including water). More preferably, the filler comprises from about 55% to about 75% of the total wet weight, and most preferable, from about 60% to about 70%.

Another ingredient usually present in joint compounds is a binder or resin. Suitable binders include polyvinyl acetate, polyvinyl alcohol, ethylene vinyl acetate co-polymer, vinylacrylic co-polymer, styrenebutadiene, polyacrylamide, other acrylic polymers, other latex emulsions, natural and synthetic starch, and casein. These binders can be used alone or in combination with one another. The amount of binder can range from about 1% to about 45% of the joint compound total wet weight. More preferably, the binder comprises from about 1% to about 20% of the total wet weight, and most preferably, from about 4% to about 14%. Preferred binders are Rhoplex HG 74M and Rhoplex AC 417M acrylic copolymers available from Rohm and Haas, Philadelphia, Pa.

A surfactant can also be included in the joint compound formulation, particularly when the dust reducing additive includes an oil. Certain surfactants have also been found to act as dust reducing additives by themselves. A preferred surfactant is Triton X-405, a nonionic surfactant available from Union Carbide Chemicals and Plastics Co. Inc., Danbury, Conn. The surfactant generally comprises less than about 3.5% of the joint compound total wet weight, and preferably less than about 0.25%.

Many joint compound formulations also contain a cellulosic thickener, usually a cellulosic ether. Suitable thickeners include methyl cellulose, hydroxypropyl cellulose, hydroxypropyl methyl cellulose, hydroxyethyl cellulose, hydroxyethyl methyl cellulose, hydroxyethyl hydroxypropyl cellulose, ethylhydroxyethyl cellulose, and sodium carboxymethyl cellulose (CMC). These thickeners can be used alone or in combination with one another. The amount of cellulosic thickener can range from about 0.1% to about 2% by weight of the joint compound. A preferred thickener is hydroxypropyl methyl cellulose available from Dow Chemical Company under the trade designation Methocel.

Another ingredient that can be included in the joint compound of the invention is a non-leveling agent. Suitable non-leveling agents include clays such as attapulgus clay, bentonite, illite, kaolin and sepiolite, and clays mixed with starches. Thickeners, such as those described above, can also function as non-leveling agents.

To provide a lighter weight joint compound, glass bubbles or a specially treated expanded perlite can be added as described in U.S. Pat. No. 4,454,267. Additional ingredients which can be utilized in the joint compound are preservatives, fungicides, anti-freeze, wetting agents, defoamers, flocculents, such as polyacrylamide resin, and plasticizers, such as dipropylene glycol dibenzoate.

In accordance with a characterizing feature of the present invention, the joint compound includes an ingredient which serves to minimize the quantity of airborne particles generated during sanding of the hardened joint compound. The additive generally comprises less than 20% of the joint compound total wet weight. More preferably, the dust reducing additive comprises between about 0.1% and about 10% of the joint compound by wet weight percent and, most preferably, between about 1.5% and about 6%.

Many ingredients have been found to effectively reduce the quantity of airborne particles generated when sanding the joint compound including oils such as animal, vegetable, and mineral oils (saturated and unsaturated), and oils derived from petroleum, pitch, natural and synthetic waxes, paraffins, solvents which evaporate slower than water, terpenes, glycols, surfactants, and mixtures thereof. A preferred dust reducing additive is a mixture of mineral oil and an unsaturated oil, such as corn oil, comprising from about 1.5% to about 6% of the joint compound total wet weight, and a surfactant comprising from about 0.15% to about 0.40% of the joint compound total wet weight. It has also been found that increasing the level of resin in the joint compound may serve to reduce the level of airborne dust generated during sanding.

While the manner by which each additive serves to suppress the formation of particles capable of becoming airborne is not fully understood, some general observations have been made. For example, it was observed that the joint compounds containing a dust reducing additive seemed to produce particles which were larger and heavier than the particles produced by joint compounds without a dust reducing additive. Thus, the dust reducing additive may cause the dust particles to agglomerate or stick together, thereby forming large heavy particles which tend not to become or remain airborne. The invention, however, is not intended to be limited to any particular mechanism.

The relative quantity of the various ingredients can vary substantially in accordance with the invention. Table 1 shows the general range of each ingredient for either a setting type joint compound or a ready-mixed type joint compound in its wet condition:

TABLE 1

| | Percent by Weight (Wet) |
| --- | --- |
| Filler | 25-95% |
| Binder | 1-45% |
| Thickener | <2% |
| Water | 2-45% |
| Dust Reducing Additive | <20% |

Test Procedure

The test procedure for measuring the quantity of airborne particles generated when sanding the hardened joint compound was as follows. First, each test specimen was prepared according to a specific formulation. The specific formulations for the various joint compounds are described more fully below along with the method used to prepare the specimens. The test specimens were approximately five inches long, one and one-half inches wide, and one quarter of an inch thick (5" by 1½" by ¼"). Before sanding, each test specimen was allowed to completely harden for at least twenty four hours at room temperature in an environment where the relative humidity generally ranged from about 25% to about 75%.

Referring to FIG. 1, there is shown the test enclosure 2 that was used to sand the test specimens 4a, 4b, 4c and measure the quantity of airborne dust particles generated. The enclosure 2 was a rectangular box six feet high, four feet wide, and two feet wide (6'×4'×2'). The top 6, bottom 8, side 10, and rear walls 12 of the enclosure 2 were constructed of wood, and the front wall 14 was constructed of transparent Plexiglas. A generally triangular access opening 16 located about one foot above the bottom wall 8 was provided in the front wall 14 to allow the individual conducting the test to insert his or her hand and arm into the enclosure and sand the specimen. The access opening 16 had a base dimension of about 7½ inches and a height of about 8½ inches. A movable cover member 18 was provided to allow the enclosure 2 to be completely sealed when sanding was completed. To sand the specimens 4a, 4b, 4c, the cover 18 was arranged in its up position as shown by the solid lines in FIG. 1. When sanding was completed, the cover 18 was pivoted downwardly to completely cover the access opening 16 as shown in phantom 18'.

As shown, three specimens 4a, 4b, 4c of joint compound were prepared on a section of wallboard 20 and the section of wallboard 20 was clamped to a mounting block 22 arranged within the enclosure 2. When tested, the specimens were located about twelve inches above the bottom wall 8 of the enclosure. Each specimen was tested individually and after each test, the enclosure was cleaned so that the quantity of airborne dust particles measured less than 0.5 mg/m$^3$. A particle counter 24 for measuring the quantity of airborne particles was mounted in the right side wall about forty eight inches above the center of the specimens 4a, 4b, and 4c.

The test specimens were sanded using a model B04552 power palm sander available from Makita Corporation of America, Buford, Ga. The sander included a 4½×4 inch pad equipped with a 120 grit mesh sanding screen mounted over a 5×3½×¾ inch open, semi-rigid, non-woven, heavy duty, stripping, backing pad available from Minnesota Mining and Manufacturing Company, St. Paul Minn. Sanding was performed at a sanding speed of approximately 14,000 OPM (orbits per minute) using ordinary sanding pressure. Ordinary sanding pressure is defined as the amount of pressure typically required to sand a hardened joint compound. Sanding pressure, therefore, is the manual pressure typically applied by an ordinary person when sanding a joint compound. It will be recognized that the sanding pressure can vary depending on the hardness of the joint compound. Sanding was continued until the specimen was completely sanded. That is, the entire thickness of the specimen was sanded so that a generally smooth wall surface was produced. Care was taken to ensure that the sanding was discontinued before the drywall itself was sanded. The amount of time required to sand each specimen varied depending on the hardness of the joint compound and the sanding pressure.

The quantity of airborne dust particles was measured starting from the time sanding was initiated until several minutes after sanding was discontinued. In general, the level of airborne dust was measured until the level decreased to less than 50% of its peak level. The quantity of airborne dust was measured using a DUSTTRAK™ aerosol monitor model 8520 available from TSI Incorporated, St. Paul, Minn. The particle counter measures the number of particles having a size of less than or equal to 10 microns. In the Examples, the peak or highest level of airborne dust measured during the test is presented.

Ingredients

A summary of the various ingredients used to prepare the joint compounds in each of the Examples is provided below:

Fillers

Calcium Carbonate—Marble Dust available from ECC International, Sylacauga, Ala.

Calcium Sulfate Dihydrate—available from J.T. Baker Chemical Co., Phillipsburg, N.J.

Mica—Mica AMC available from Kraft Chemical Co., Melrose Park, Ill. Mica prevents cracks from forming as the joint compound hardens.

Kaolin—Aldrich Chemical Co., Milwaukee, Wis.

Glass Bubbles—K1 (177 microns-0.14 g/cm$^3$) glass bubbles available from Minnesota Mining and Manufacturing Company, St. Paul, Minn. Glass bubbles improve the sandability of the joint compound and help to form a lighter weight joint compound.

Binders

Rhoplex HG 74M, Rhoplex HG 74P, Rhoplex AC 417M, Rhoplex 2620, and Rhoplex EC-2848—acrylic resins available from Rohm & Haas, Philadelphia, Pa.

Airflex RP-226—vinyl acetate-ethylene copolymer available from Air Products and Chemicals, Inc., Allentown, Pa.

Waxes

Octowax 321—available from Tiarco Chemical Div., Textile Robber & Chemical Co., Dalton, Ga.

Boler 1070—a paraffin wax available from Boler Inc., Wayne, Pa.

Carbowax 540—synthetic wax available from Union Carbide Corp., Danbury, Conn.

Oils

Corn Oil—conventional corn oil. A suitable corn oil is available from Eastman Kodak Co., Rochester, N.Y.

Linoleic Acid—an unsaturated oil, available from Eastman Kodak Co., Rochester, N.Y.

Castor Oil—an unsaturated vegetable oil available from Aldrich Chemical Co., Milwaukee, Wis.

Tung Oil—an unsaturated vegetable oil available from Woodworkers Store, Medina, Minn.

Mineral Oil—Carnation light mineral oil available from Witco Corporation, Sonneborn Division, New York, N.Y.

Surfactants

Surfactants were generally included in the joint compound formulations when the dust reducing additive included an oil to help emulsify the oil and combine it with a water based joint compound. Certain surfactants, however, were found to have a dust reducing effect when used by themselves.

FC 430—a nonionic surfactant available from Minnesota Mining and Manufacturing Company, Industrial Chemicals, St. Paul, Minn.

Triton X-405—a nonionic surfactant (octylphenoxy polyethoxy ethanol) available from Union Carbide Chemicals and Plastics Co. Inc., Danbury, Conn.

Variquat B-200—a cationic surfactant (benzyl trimethyl ammonium chloride 60%) available from Sherex Chemical Co. Inc., Dublin. Ohio.

Steol KS 460—an anionic surfactant (alkyl ether sulfate sodium salt 60%) available from Stephon Chemical Co., Northfield, Ill.

Span 85—a nonionic surfactant (sorbitan trioleate) available from ICI Americas Inc., Wilmington, Del.

Tween 80—nonionic surfactant (polysorbate 80) available from ICI Americas Inc., Wilmington, Del.

Solvents

Isopar M—an aliphatic hydrocarbon available from Exxon Chemical Co., Houston, Tex.

Norpar 15—a normal paraffin available from Exxon Chemical Co., Houston, Tex.

Heptane—available from Aldrich Chemical Co, Milwaukee, Wis.

Isopropanol—available from Aldrich Chemical Co, Milwaukee, Wis.

Propylene carbonate—available from Arco Chemical Co., Newton Square, Pa., under the trade designation Arconate HP.

Tripropylene glycol methyl ether available from Dow Chemical Co., Midland, Mich.

Tripropylene glycol-n-butyl ether available from Dow Chemical Co., Midland, Mich.

Ethylene glycol phenyl ether available from Dow Chemical Co., Midland, Mich.

D. Linonene—a terpene available from SCM Glidden Organics, Jacksonville, Fla.

Exxsol D-110—an aliphatic hydrocarbon available from Exxon Chemical Co., Houston, Tex.
Exxate 1300—$C_{13}$ alkyl acetate available from Exxon Chemical Co., Houston, Tex.
Glycerol—available from J.T. Baker Chemical Co, Phillipsburg, N.J.

Thickener
Methocel 311—hydroxypropyl methylcellulose available from Dow Chemical Co., Midland, Mich.

EXAMPLES

The invention is illustrated by the following examples which present various embodiments of the invention. In general, the joint compounds were prepared by: (1) mixing the water and thickener, if any, with the binder; (2) adding the dust reducing additive; and (3) adding the fillers, mixing continuously. If the formulation contained a dust reducing additive in the form of an oil and a surfactant, the surfactant was typically added before the oil. More specific procedures used to prepare certain joint compound formulations are described more fully below.

Table 2 presents the test results for a control joint compound formulation which did not contain a dust reducing additive, along with the formulation and test results for Examples 1-3, each of which contained a dust reducing additive in the form of a wax. Each formulation is presented by wet weight percent of each ingredient, that is, including water.

TABLE 2

WAXES

Formulations by Wet Weight Percent

| Ingredient | Control | 1 | 2 | 3 |
|---|---|---|---|---|
| Calcium carbonate | 64.3 | 61.24 | 44.0 | 63.34 |
| Mica | | 2.7 | | |
| Kaolin | 1.0 | 2.1 | | 1.04 |
| Glass Bubbles | 4.7 | | 6.0 | 1.73 |
| Rhoplex AC 417 M | 10.1 | 9.8 | 17.0 | |
| Airflex RP-226 | | | | 5.23 |
| Triton X-405 | | 0.13 | 0.2 | 0.16 |
| Stearic Acid | | | 0.75 | |
| 28% Ammonium Hydroxide | | | 0.38 | |
| Water | 19.9 | 16.9 | 24.17 | 24.87 |

TABLE 2-continued

WAXES

Formulations by Wet Weight Percent

| Ingredient | Control | 1 | 2 | 3 |
|---|---|---|---|---|
| Octowax 321 | | 7.13 | | |
| Boler 1070 | | | 7.5 | |
| Carbowax 540 | | | | 3.63 |
| Airborne Dust | 72 mg/m$^3$ | 28 mg/m$^3$ | 3.5 mg/m$^3$ | 5 mg/m$^3$ |
| Drying Time | 1 day | 1 day | 1 day | 1 day |

The control formulation included a binder (Rhoplex AC 417 M), fillers (calcium carbonate, kaolin, and glass bubbles), and water. After being allowed to dry for one day, the specimen having the control formulation was sanded and found to produce a peak quantity of airborne dust particles having a size of less than or equal to 10 microns of 72 mg/m$^3$. In Example 1, the formulation includes approximately 7% by weight wax (Octowax 321) which reduced the quantity of airborne dust to 28 mg/m$^3$. In Example 2, the secondary fillers mica and kaolin have been replaced by glass bubbles, and a paraffin wax (Boler 321) was added. The quantity of dust generated by the resulting formulation was reduced to 3.5 mg/m$^3$.

The formulation of Example 2 was prepared by combining the wax and stearic acid and heating them to 170° F. until a clear liquid was formed. Approximately half of the water was then heated to 170° F. and added to the ammonium hydroxide. The wax-stearic acid mixture was then combined with the water-ammonium hydroxide mixture, and this mixture was cooled to room temperature while mixing continuously. In turn, the Rhoplex AC 417M, the Triton X-405, the remaining quantity of water, the calcium carbonate, and the glass bubbles were added and mixed to produce a uniform mixture.

The joint compound formulation in Example 3 contains a vinyl acetate binder (Airflex RP-226) and a wax (Carbowax 540—polyethylene glycol). This joint compound formulation exhibited a dust level of 5 mg/m$^3$. Carbowax is synthetic wax which is soluble or miscible in water. While paraffins and Carbowax are both considered waxes, they are believed to represent dissimilar waxes.

Table 3A presents the formulations and test results for Examples 4-9, each of which contains one oil and a surfactant which serve to suppress the formation of airborne dust particles during sanding.

TABLE 3A

OILS

Formulations by Wet Weight Percent

| Ingredient | 4 | 5 | 6 | 7 | 8 | 9 |
|---|---|---|---|---|---|---|
| Calcium Carbonate | 54.94 | 54.72 | 54.72 | 55.15 | 56.41 | 56.6 |
| Glass Bubbles | 8.9 | 10.8 | 10.8 | 8.55 | 8.25 | 6.32 |
| Rhoplex AC 417M | 15.63 | 15.57 | 15.57 | 15.69 | 25.77 | 26.31 |
| Triton X-405 | 0.39 | 0.39 | 0.39 | 0.39 | 0.21 | 0.21 |
| Water | 15.5 | 15.44 | 15.44 | 15.56 | 6.19 | 6.32 |
| Corn oil | 4.64 | | | | | |
| Linoleic acid | | 3.08 | 3.08 | | | |
| Castor oil | | | | 4.66 | | |
| Mineral oil | | | | | 3.17 | |
| Tung oil | | | | | | 4.24 |
| Airborne Dust | 2.3 mg/m$^3$ | 3.5 mg/m$^3$ | 45 mg/m$^3$ | 2.5 mg/m$^3$ | 7 mg/m$^3$ | 13 mg/m$^3$ |
| Drying Time | 1 day | 1 day | 30 days | 2 days | 1 day | 2 days |

In each example, the oil significantly reduced the quantity of airborne particles produced during sanding. It will be noted that Examples 5 and 6 had similar formulations. In Example 5, however, the specimen was permitted to dry for only 1 day and in Example 6, the specimen was permitted to dry for 30 days. By increasing the drying time from 1 day to 30 days, the quantity of airborne dust generated having a size less than or equal to 10 microns increased from 3.5 to 45 mg/m$^3$. It has generally been observed that unsaturated oils, such as unsaturated vegetable oils and linoleic acid, reduce the quantity of airborne particles generated after a short drying time (e.g. 1 day) without significantly affecting the adhesive properties of the joint compound. In addition, the joint compound can be sanded quite easily. After an extended drying time (e.g. 30 days), however, it has been observed that the joint compound becomes more difficult to sand and the quantity of airborne dust particles increases.

As shown in Example 8, mineral oil by itself was also found to significantly reduce airborne dust levels after a short drying time. In addition, mineral oil has been found to reduce airborne dust levels over an extended period of time. Mineral oil, however, was found to adversely affect the adhesive properties of the joint compound.

Table 3B presents the formulations and test results for Examples 10-15, each of which includes a dust reducing additive comprising a mixture of corn oil and mineral oil, and a surfactant. In each Example, the mineral oil and corn oil were premixed.

adversely affect the adhesive properties of the joint compound and also reduced airborne dust levels over an extended period of time.

Examples 11 and 12 have similar formulations but in Example 12, the drying time was increased to 19 days. As shown, the quantity of dust generated after 19 days increased only slightly. Thus, the dust reducing capability of the corn oil-mineral oil mixture remained much more stable over time than the formulations including linoleic acid presented in Examples 5 and 6.

Example 13 shows that significant dust reduction is also achieved when using a combination additive of corn oil and mineral oil in a joint compound that contains a thickener (i.e. Methocel 311). Example 13 was prepared by premixing the Methocel 311 with the water until a clear liquid was formed. The surfactant FC 430 and resin Rhoplex HG 74M were then added. Next, the mineral oil and corn oil were premixed and added to the other ingredients, mixing continuously. The calcium carbonate and glass bubbles were then added.

The formulations of the joint compounds in Examples 14 and 15 were similar but Example 14 included a cationic surfactant (Variquat B-200) and Example 15 included an anionic surfactant (Steol KS-460). In both examples, the mixture of corn oil and mineral oil together with the surfactant significantly reduced the quantity of airborne dust generated.

TABLE 3B

OIL MIXTURES

Formulations by Wet Weight Percent

| Ingredient | 10 | 11 | 12 | 13 | 14 | 15 |
|---|---|---|---|---|---|---|
| Calcium Carbonate | 68.65 | 63.69 | 63.69 | 58.07 | 61.05 | 61.05 |
| Glass Bubbles |  | 4.8 | 4.8 | 5.0 | 5.25 | 5.25 |
| Mica | 3.0 |  |  |  |  |  |
| Kaolin | 2.4 | 0.99 | 0.99 |  | 3.0 | 3.0 |
| Rhoplex AC 417M | 11.0 | 9.9 | 9.9 |  |  |  |
| Rhoplex HG 74M |  |  |  | 15.13 | 11.0 | 11.0 |
| Triton X-405 | 0.15 | 0.15 | 0.15 |  |  |  |
| Variquat B-200 |  |  |  |  | 0.20 |  |
| Steol KS-460 |  |  |  |  |  | 0.20 |
| FC 430 |  |  |  | 0.15 |  |  |
| Methocel 311 |  |  |  | 0.14 |  |  |
| Water | 11.3 | 15.5 | 15.5 | 18.01 | 17.0 | 17.0 |
| Corn oil | 0.5 | 0.99 | 0.99 | 0.5 | 0.5 | 0.5 |
| Mineral oil | 3.0 | 3.98 | 3.98 | 3.0 | 2.0 | 2.0 |
| Airbone Dust | 5 mg/m$^3$ | 1.5 mg/m$^3$ | 5.5 mg/m$^3$ | 2.5 mg/m$^3$ | 10 mg/m$^3$ | 7 mg/m$^3$ |
| Drying Time | 1 day | 1 day | 19 days | 4 days | 4 days | 4 days |

The combination of mineral oil and an unsaturated oil, such as linoleic acid or corn oil which contains some linoleic acid, was found to be a low dust additive that did not significantly Tables 4A and 4B present the formulations and test results for Examples 16-28. These examples demonstrate the dust reducing effect of various solvents.

TABLE 4A

SOLVENTS

Formulation by Wet Weight Percent

| Ingredient | 16 | 17 | 18 | 19 | 20 | 21 |
|---|---|---|---|---|---|---|
| Calcium Carbonate | 61.18 | 69.69 | 63.12 | 60.18 | 48.90 | 60.49 |
| Glass Bubbles | 3.81 | 2.97 | 3.62 | 3.91 | 7.96 | 6.03 |
| Kaolin |  |  |  |  |  | 1.0 |
| Rhoplex AC 417 | 13.09 | 10.22 | 12.44 | 13.43 | 30.8 |  |

TABLE 4A-continued

SOLVENTS

Formulation by Wet Weight Percent

| Ingredient | 16 | 17 | 18 | 19 | 20 | 21 |
|---|---|---|---|---|---|---|
| Rhoplex HG 74M | | | | | | 12.0 |
| Triton X-405 | 0.24 | 0.19 | 0.22 | 0.25 | | 0.15 |
| FC 430 | | | | | 0.12 | |
| Water | 18.02 | 14.07 | 17.12 | 18.48 | 7.7 | 16.86 |
| Propylene carbonate | 3.66 | | | | | |
| Tripropylene glycol methyl ether | | 2.86 | | | | |
| Tripropylene glycol-n butyl ether | | | 3.48 | | | |
| Ethylene glycol phenyl ether | | | | 3.75 | | |
| D. limonene | | | | | 4.52 | |
| Glycerol | | | | | | 3.47 |
| Airborne Dust | 14 mg/m$^3$ | 7.5 mg/m$^3$ | 3.5 mg/m$^3$ | 4.5 mg/m$^3$ | 5 mg/m$^3$ | 19.5 mg/m$^3$ |
| Drying Time | 2 days | 3 days | 2 days | 2 days | 1 day | 1 day |

TABLE 4B

SOLVENTS

Formulations by Wet Weight Percent

| Ingredient | 22 | 23 | 24 | 25 | 26 | 27 | 28 |
|---|---|---|---|---|---|---|---|
| Calcium carbonate | 69.95 | 69.95 | 68.31 | 68.31 | 70.69 | 68.65 | 69.95 |
| Mica | 3.0 | 3.0 | | | | 3.0 | 3.0 |
| Kaolin | 2.4 | 2.4 | | | | 2.4 | 2.4 |
| Glass Bubbles | | | 3.1 | 3.1 | 2.86 | | |
| Rhoplex AC 417 M | 7.0 | 7.0 | 10.6 | 10.6 | 9.82 | 11.0 | 7.0 |
| Triton X-405 | 0.15 | 0.15 | 0.19 | 0.19 | 0.18 | 0.15 | 0.15 |
| Water | 14.0 | 14.0 | 14.6 | 14.6 | 13.5 | 11.3 | 14.0 |
| Heptane | 3.5 | | | | | | |
| Isopropanol | | 3.5 | | | | | |
| Isopar M | | | 3.2 | 3.2 | | | |
| Norpar 15 | | | | | 2.95 | | |
| Exxsol D-110 | | | | | | 3.5 | |
| Exxate 1300 | | | | | | | 3.5 |
| Airborne Dust | 105 mg/m$^3$ | 160 mg/m$^3$ | 7.5 mg/m$^3$ | 110 mg/m$^3$ | 27 mg/m$^3$ | 15 mg/m$^3$ | 12.8 mg/m$^3$ |
| Drying Time | 1 day | 1 day | 1 day | 5 days | 5 days | 1 day | 1 day |

As shown in Examples 22 and 23, not all solvents are effective at reducing the quantity of airborne dust. In addition, Examples 24 and 25 demonstrate that an additive may be effective at reducing the quantity of dust generated for a given period of time, but that the level of dust will increase over time as the additive evaporates. Such a formulation may be desirable since the additive, depending on its volatility, can provide dust reduction for a predetermined period of time but will dissipate from the joint compound, thereby leaving a joint compound having properties similar to joint compounds without any dust reducing additive.

Table 5 presents the test results for Examples 29-33 which show the level of airborne dust generated by formulations containing different surfactants.

TABLE 5

SURFACTANTS

Formulations by Wet Weight Percent

| Ingredient | 29 | 30 | 31 | 32 | 33 |
|---|---|---|---|---|---|
| Calcium Carbonate | 63.91 | 61.05 | 61.05 | 62.98 | 62.57 |
| Kaolin | | 3.0 | 3.0 | 1.03 | 1.03 |
| Glass Bubbles | 5.01 | 5.25 | 5.25 | 4.02 | 4.61 |
| Rhoplex HG 74M | 11.03 | 11.0 | 11.0 | 11.35 | 11.28 |
| Water | 17.04 | 17.0 | 17.0 | 17.53 | 17.43 |
| Triton X-405 | 3.01 | | | | |
| Variquat B-200 | | 2.7 | | | |
| Steol KS-460 | | | 2.7 | | |
| Span 85 | | | | 3.09 | |
| Tween 80 | | | | | 3.08 |
| Airborne Dust | 65 mg/m$^3$ | 63 mg/m$^3$ | 42 mg/m$^3$ | 10 mg/m$^3$ | 8.5 mg/m$^3$ |
| Drying Time | 1 day | 4 days | 4 days | 5 days | 5 days |

It will be noted that in Examples 29-33, the percentage of surfactant added to the joint compound formulations was significantly greater than the quantity used to emulsify the oil in Examples 4-15 which ranged from 0.15 to 0.39 percent by weight. In Example 29, the nonionic surfactant Triton X-405 was found to only slightly reduce the quantity of airborne dust compared to the control formulation. Similarly, in Example 30, the cationic surfactant Variquat B-200 was found to slightly reduce the quantity of airborne dust. In Example 31, the anionic surfactant Steol KS-460 was found to moderately reduce the quantity of airborne dust. It was noted that each of the surfactants in Examples 29-31 was initially solid materials which had to be solubilized in water.

In Examples 32 and 33, the surfactants were liquids which did not dry easily. In Example 32, the nonionic surfactant Span 85, which is insoluble in water and has an HLB of 1.8, was found to have a significant dust reducing effect. In Example 33, Tween 80, which is soluble in water and has an HLB of 15, was found to have a significant dust reducing effect. It was therefore observed from Examples 32 and 33 that liquid surfactants which do not dry quickly may themselves serve as effective dust reducing additives.

Table 6A presents the formulations and test results of Examples 34-36 which show the effect that different resins had on dust generation.

TABLE 6A

DIFFERENT RESINS

| | Formulations by Wet Weight Percent | | |
|---|---|---|---|
| Ingredient | 34 | 35 | 36 |
| Calcium Carbonate | 63.45 | 64.05 | 62.23 |
| Kaolin | 1.0 | 1.0 | 2.91 |
| Glass Bubbles | 5.5 | 4.9 | 5.10 |
| Triton X-405 | 0.45 | 0.15 | 0.15 |
| Water | 19.6 | 19.8 | 16.5 |
| Rhoplex AC 417M | 10.0 | | |
| Rhoplex HG 74M | | 10.1 | 10.68 |
| Corn oil | | | 0.49 |
| Mineral oil | | | 1.94 |
| Airborne Dust | 51 mg/m$^3$ | 81 mg/m$^3$ | 7 mg/m$^3$ |
| Drying Time | 1 day | 1 day | 1 day |

Examples 34 and 35 show that Rhoplex AC 417M, a softer resin than Rhoplex HG 74M, may slightly reduce the level of airborne dust. In Example 36, when a dust reducing additive in the form of a corn oil mineral oil mixture was added, the level of dust generated was reduced significantly.

Table 6B presents the formulations and test results for Examples 37-39 which contained a high level of resin.

TABLE 6B

HIGH RESIN LEVELS

| | Formulations by Wet Weight Percent | | |
|---|---|---|---|
| Ingredient | 37 | 38 | 39 |
| Calcium Carbonate | 58.29 | 61.02 | 59.61 |
| Kaolin | 0.96 | 1.01 | 1.02 |
| Glass Bubbles | 5.6 | 1.11 | 3.41 |
| Triton X-405 | 0.15 | 0.16 | 0.15 |
| Rhoplex HG 74M | 35.0 | | |
| Rhoplex 2620 | | 36.7 | |
| Rhoplex EC-2848 | | | 35.81 |
| Airborne Dust | 30 mg/m$^3$ | 6 mg/m$^3$* | 6.5 mg/m$^3$* |
| Drying Time | 1 day | 1 day | 1 day |

*test discontinued prior to complete sanding of specimen

In each formulation, the quantity of resin was at least 35% by weight. While each of the resins included approximately 50% by weight water, it will be noted that no additional water was added to any of the joint compound formulations. Rhoplex HG 74M is a harder resin than Rhoplex 2620 and EC-2848. The quantity of airborne dust generated for the formulations in Examples 37-39 was found to be less than the quantity of airborne dust generated by the control joint compound formulation in Table 2, but the formulations in Examples 37-39 were found to have objectionable sanding properties. During the testing of the specimens of Examples 38 and 39, only half of the specimen could be sanded due to the rubbery nature of the joint compound.

Table 6C presents the formulations and test results for joint compounds containing a vinyl acetate binder (Airflex RP-226). The control formulation contains a small quantity of surfactant which may serve to slightly reduce dust generation but is otherwise free of a dust reducing additive. Example 40 contains a dust reducing additive in the form of a mixture of corn oil and mineral oil which was found to significantly reduce the quantity of dust generated.

TABLE 6C

VINYL ACETATE BINDER

| | Formulations by Wet Weight Percent | |
|---|---|---|
| Ingredient | Control | 40 |
| Calcium Carbonate | 63.01 | 62.87 |
| Kaolin | 1.03 | 1.03 |
| Glass Bubbles | 2.07 | 2.45 |
| Triton X-405 | 0.15 | 0.15 |
| Water | 28.54 | 24.7 |
| Airflex RP-226 | 5.2 | 5.19 |
| Corn Oil | | 0.52 |
| Mineral Oil | | 3.09 |
| Airborne Dust | 84 mg/m$^3$ | 3 mg/m$^3$ |
| Drying Time | 1 day | 1 day |

Table 7 presents the results for tests conducted by applying the dust reducing additive as a coating to a fully hardened joint compound. In each test, a specimen formed of Light Weight All Purpose Joint Compound available from United States Gypsum Co., Chicago, Ill. was prepared and allowed to harden for 4 days. The hardened joint compound was then saturated with the dust reducing additive and allowed to dry for an additional period of time, either 7 hours or 24 hours. The specimens were then sanded. It was found that when applied as a coating, the dust reducing additive served to significantly reduce the quantity of airborne dust particles generated by the joint compound.

TABLE 7

DUST REDUCING ADDITIVE APPLIED AS A COATING

| | Exxsol D 110 | Isopar M |
|---|---|---|
| Airborne Dust (Dried 7 hours) | 4 mg/m$^3$ | 7.5 mg/m$^3$ |
| Airborne Dust (Dried 24 hours) | 4 mg/m$^3$ | 27 mg/m$^3$ |

Table 8 presents the formulations and test results for joint compound formulations containing a calcium sulfate dihydrate filler material. In Example 41, a significant reduction in airborne dust generation was achieved by including a dust reducing additive comprising a mixture of surfactant, corn oil, and mineral oil in the joint compound.

TABLE 8

CALCIUM SULFATE DIHYDRATE FILLER

| | Formulations by Wet Weight Percent | |
|---|---|---|
| Ingredient | Control | 41 |
| Calcium Sulfate Dihydrate | 70.36 | 66.6 |
| Rhoplex HG 74M | 8.64 | 9.7 |
| Water | 21 | 19.3 |
| Triton X-405 | | 0.2 |
| Corn oil | | 0.7 |
| Mineral oil | | 3.5 |
| Airborne Dust | 225 mg/m$^3$ | 20 mg/m$^3$ |
| Drying Time | 1 day | 1 day |

Table 9 presents test results obtained using several commercially available joint compounds.

TABLE 9

CONVENTIONAL JOINT COMPOUNDS - NO ADDITIVE

| Conventional Joint Compound | Airborne Dust | Drying Time |
|---|---|---|
| All Purpose Joint Compound | 100 mg/m$^3$ | 3 days |
| Light weight All Puropse Joint Compound | 155 mg/m$^3$ | 3 days |
| Gold Bond Pro Form Prof. Lite Joint Compound | 90 mg/m$^3$ | 4 days |
| Easy Sand 90 Setting Joint Compound | 280 mg/m$^3$ | 3 days |

The first three joint compounds are ready-mixed type joint compounds manufactured and marketed by United States Gypsum Co., Chicago, Ill., and Easy Sand 90 is a setting type joint compound manufactured by National Gypsum Co., Charlotte, N.C.

Table 10 shows the effect of adding a dust reducing additive to the conventional joint compounds of Table 9.

TABLE 10

CONVENTIONAL JOINT COMPOUND WITH ADDITIVE

| | Formulations by Wet Weight Percent | | | |
|---|---|---|---|---|
| Ingredient | All Purpose Joint Compound | Light weight All Purpose Joint Compound | Gold Bond Pro Formula Professional Lite Joint Compound | Easy Sand 90 Setting Joint Compound |
| Joint Compound | 96.35 | 96.35 | 96.35 | 67.74 |
| Corn oil | 0.5 | 0.5 | 0.5 | 0.51 |
| Mineral oil | 3.0 | 3.0 | 3.0 | 4.1 |
| Triton X-405 | 0.15 | 0.15 | 0.15 | 0.15 |
| Water | | | | 27.5 |
| Airborne Dust | 2 mg/m$^3$ | 12 mg/m$^3$ | 5 mg/m$^3$ | 13 mg/m$^3$ |
| Drying Time | 3 days | 1 day | 1 day | 2 days |

In each case, a premixed dust reducing additive including corn oil, mineral oil, and the surfactant Triton X-405 was added to each of the conventional joint compounds just prior to preparing the specimens, thereby serving to significantly reduce the quantity of airborne dust generated by sanding the hardened joint compound.

Table 11 presents the results obtained when a conventional spackling compound, also referred to as a wall repair compound, was tested.

TABLE 11

SPACKLING COMPOUND

| | Control | 42 |
|---|---|---|
| Spakfast | 100 | 95.35 |
| Corn oil | | 0.5 |
| Mineral oil | | 4.0 |
| Triton X-405 | | 0.15 |
| Airborne Dust | 11 mg/m$^3$ | 3 mg/m$^3$ |

Spakfast is a wall repair compound available from Minnesota Mining and Manufacturing Company, St. Paul, Minn. Spakfast contains a high level of resin and exhibits a relatively low level of airborne dust. The level of airborne dust generated, however, was found to be significantly reduced when a dust reducing additive including corn oil, mineral oil, and a surfactant was added to the Spakfast formulation. Thus, according to the present invention, a dust reducing additive can be added to a conventional spackling compound to significantly reduce the quantity of airborne dust generated by the spackling compound.

While the formulations of each example has been presented in terms of the weight percent of each ingredient, it will be recognized that the formulations can also be presented in terms of the volume percent of each ingredient. By way of example, Table 12 presents two representative formulations in terms of both percent by weight and percent by volume.

TABLE 12

FORMULATION IN WEIGHT VOLUME PERCENT

| | Formulation 1 | | Formulation 2 | |
|---|---|---|---|---|
| Ingredient | % by Wt | % by Vol | % by Wt | % by Vol |
| Calcium Carbonate | 62.23 | 25.66 | 54.73 | 14.82 |
| Glass Bubbles | 5.10 | 40.55 | 10.8 | 59.12 |
| Kaolin | 2.91 | 1.47 | 1 | 0.34 |
| Rhoplex HG 74P | 10.68 | 10.8 | 15.57 | 11.69 |
| Triton X-405 | 0.15 | 0.15 | 0.15 | 0.11 |
| Water | 16.5 | 18.37 | 15.25 | 11.68 |
| Corn oil | 0.49 | 0.60 | 0.5 | 0.42 |
| Mineral oil | 1.94 | 2.40 | 2 | 1.82 |

Since glass bubbles have a low density and calcium carbonate has a high density, the percentage of glass bubbles increases significantly while the percentage of calcium carbonate decreases significantly when converting the formulation from one based on weight to one based on volume.

The patents, patent documents, and patent applications cited herein are incorporated by reference in their entirety as if each were individually incorporated by reference. It will be apparent to those of ordinary skill in the art that various changes and modifications may be made without deviating from the inventive concept set forth above. Thus, the scope of the present invention should not be limited to the structures described in this application, but only by the structures described by the language of the claims and the equivalents of those structures.

What is claimed is:

1. A joint compound comprising:
   from 2% by weight to 45% by weight water;
   from 25% by weight to 95% by weight filler;
   binder comprising at least one of polyvinyl acetate, ethylene vinyl acetate co-polymer and polyacrylamide; and from 0.1% by weight to about 10% by weight dust reducing additive comprising at least one of pitch, a terpene, and a petroleum derivative, said joint compound having a mud-like consistency and, when hardened, is smoothable by sanding.

2. The joint compound of claim 1, wherein the dust reducing additive comprises pitch.

3. The joint compound of claim 1, wherein the dust reducing additive comprises a terpene.

4. The joint compound of claim 1, wherein the dust reducing additive comprises a petroleum derivative.

5. The joint compound of claim 1, further comprising wax.

6. The joint compound of claim 5, comprising from 1.5% to 6% wax.

7. The joint compound of claim 1, wherein the filler is selected from the group consisting of calcium carbonate, calcium sulfate dehydrate, and calcium sulfate hemihydrate.

8. The joint compound of claim 1, comprising from about 55% by weight to about 75% by weight filler.

9. The joint compound of claim 1, further comprising a thickener comprising at least one of methyl cellulose, hydroxypropyl cellulose, hydroxypropyl methyl cellulose, hydroxyethyl cellulose, hydroxyethyl methyl cellulose, hydroxyethyl hydroxypropyl cellulose, ethyl hydroxyethyl cellulose and sodium carboxymethyl cellulose.

10. The joint compound of claim 1, further comprising at least one of clay, attapulgus clay, bentonite, illite, kaolin, and sepiolite.

11. The joint compound of claim 1, further comprising glass bubbles.

12. The joint compound of claim 1, wherein the filler comprises at least one of mica, perlite, talc, limestone, pyrophyllite, silica and diatomaceous earth.

13. The joint compound of claim 1, further comprising: glass bubbles.

14. The joint compound of claim 1 further comprising oil.

15. A method of using the composition of claim 1, the method comprising applying the composition to a joint between adjacent wallboard panels.

16. The method of claim 15 further comprising taping the joint.

17. The method of claim 16 further comprising:
allowing the composition to dry; and
sanding the dried composition.

18. A dry wall composition comprising:
from 2% by weight to 45% by weight water;
from 25% by weight to 95% by weight filler;
binder comprising at least one of polyvinyl acetate, ethylene vinyl acetate co-polymer and polyacrylamide; and
from 0.1% by weight to about 10% by weight dust reducing additive comprising at least one of pitch, a terpene, and a petroleum derivative,
said dry wall compound having a mud-like consistency and, when hardened, is smoothable by sanding.

19. The dry wall composition of claim 18, wherein the dust reducing additive comprises pitch.

20. The dry wall composition of claim 18, wherein the dust reducing additive comprises a terpene.

21. The dry wall composition of claim 18, wherein the dust reducing additive comprises a petroleum derivative.

* * * * *